United States Patent

Tachibana

Patent Number: 5,710,750
Date of Patent: Jan. 20, 1998

[54] OPTICAL DISC DEVICE

[75] Inventor: Kaoru Tachibana, Kanagawa, Japan

[73] Assignee: Sony Corporation, Tokyo, Japan

[21] Appl. No.: 717,199

[22] Filed: Sep. 18, 1996

[30] Foreign Application Priority Data

Sep. 22, 1995 [JP] Japan .................................. 7-267948

[51] Int. Cl.$^6$ ...................................................... G11B 7/00
[52] U.S. Cl. ................................................ 369/59; 369/124
[58] Field of Search ................................ 369/59, 124, 32, 369/48, 47, 54

[56] References Cited

U.S. PATENT DOCUMENTS

| | | | |
|---|---|---|---|
| 5,497,361 | 3/1996 | Mita et al. | 369/124 |
| 5,548,570 | 8/1996 | Hirajima et al. | 369/59 |
| 5,570,335 | 10/1996 | Ogata et al. | 369/124 |

FOREIGN PATENT DOCUMENTS

| | | |
|---|---|---|
| 63-244317 | 10/1988 | Japan . |
| 63-244318 | 10/1988 | Japan . |

Primary Examiner—Tan Dinh
Attorney, Agent, or Firm—Limbach & Limbach L.L.P.

[57] ABSTRACT

An optical disc device is equipped with a high-pass filter for removing a low-frequency noise in a played-back signal, an adder for adding the output signal of the high-pass filter and a correction signal as a low frequency component lost from the played-back data at the noise removal, a first comparator for binarizing the output signal of the adder, and a low-pass filter, having a frequency characteristic complementary to that of the high-pass filter, for suppressing a high frequency component of the output signal of the first comparator to generate the correction signal. In addition, a second comparator for binarizing the output signal of the adder taking a slice level as a reference and outputting played-back data and a controller for varying the slice level and/or a direct current level of the output signal of the adder so that a duty ratio of the played-back data becomes a prescribed value are provided. Thus, the influence of low frequency noise can then be effectively avoided and high-density recorded data can be surely played-back even when the d.c. level of the played-back signal fluctuates due to variations in the laser power.

2 Claims, 9 Drawing Sheets

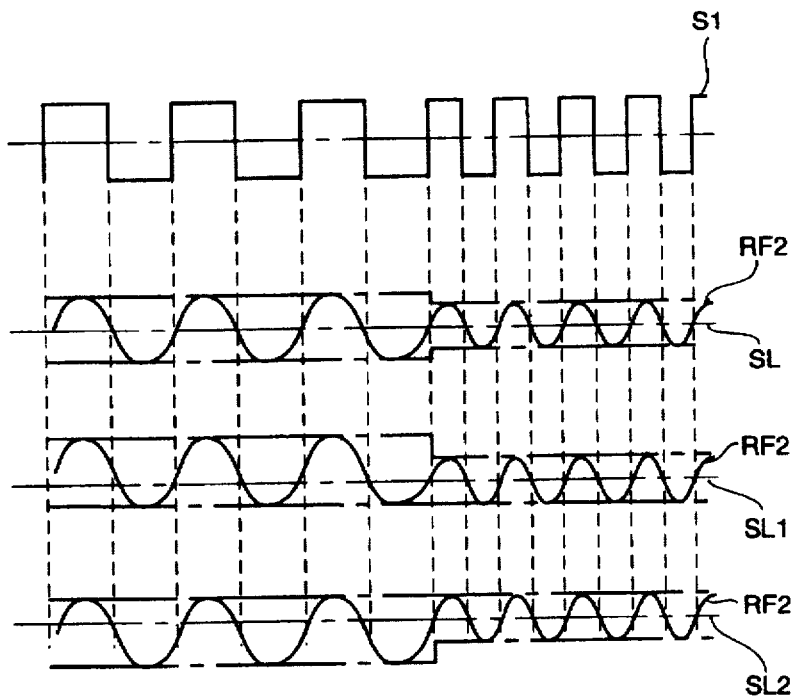
FIG. 6A
FIG. 6B
FIG. 6C
FIG. 6D
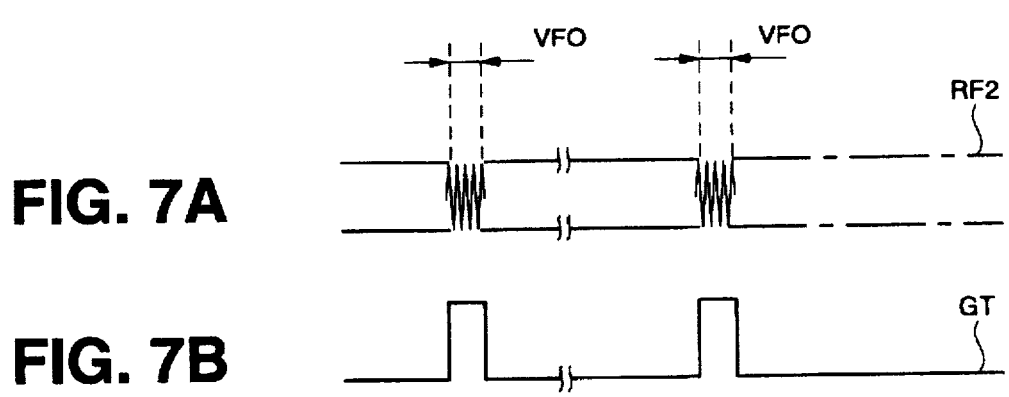
FIG. 7A
FIG. 7B

OPTICAL DISC DEVICE

BACKGROUND OF THE INVENTION

1. Field of the Invention

The present invention relates to an optical disc device, and more particularly relates to an optical disc device suitable for, for example, write once optical disc.

2. Description of Related Art

Conventionally, with, for example, write once optical disc devices, data recorded to a high-density on an optical disc has been played-back by removing a noise component from and then binarizing a played-back signal while controlling the power of a laser at a level suitable for the playback.

Namely, with this kind of optical disc device, the desired data can be recorded on an optical disc to a high-density by applying a so-called "edge recording" technique where data being recorded is subjected to encoding processing using modulation code such as RLL (Run Length Limited) (1, 7) code, with the resulting encoded data then being recorded.

During data recording, the optical disc device projects a laser beam on the information recording surface of the optical disc so as to cause localized heating. Thus, pits are then sequentially formed in correspondence with the data being recorded so that the desired data is recorded. As a result, at the optical disc device, the size of the pits change when the laser power is changed and the direct current (d.c.) level of the played-back signal is therefore also changed.

The optical disc device therefore corrects the laser power at the time of recording in response to ambient temperature or results of such measures as test writing to a test writing region and thus the laser power is controlled so that required-shaped pits can be formed even when the recording medium sensitivity is different or the ambient temperature changes.

In the optical disc device, however, the d.c. level of the played-back signal fluctuates due to not only fluctuations in the reflectivity and sensitivity of the recording medium, but also remaining errors during focus control and tracking control, and the fluctuations are observed as low frequency noise in the played-back signal. Because of this, at the optical disc device, the low frequency noise mixed in the played-back signal is removed using a high-pass filer, the played-back signal is binarized using a prescribed slice level and played-back data is produced.

As a result of these processing, in the optical disc device logical levels of the produced played-back data are made to be changed at the correct timing (i.e. at a timing corresponding to the coded data at the time of recording) and bit errors in this played-back data can therefore be effectively avoided.

However, it is still difficult to keep the laser power at the optimized value completely even when the laser power is controlled with results of such measures as text writing and the d.c. level sometimes deviates from the optimum value. In this case, the d.c. level of the played-back signal therefore varies and the timing of the edge of the played-back data varies, which might cause bit errors.

SUMMARY OF THE INVENTION

Accordingly, it is an object of the present invention to provide an optical disc device capable of playing-back high-density-recorded data reliably even when laser power deviates from the optimum value.

In order to resolve the problems involved, the present invention is applied to an optical disc device for playing back data recorded on a disc-shaped recording medium on the basis of a played-back signal obtained by projecting a light beam onto the disc-shaped recording medium and receiving the light beam returned from the disc-shaped recording medium. This optical device is made to comprise a high-pass filter for suppressing a low frequency component of the played-back signal and then outputting the resulting signal, an adder for adding an output signal of the high-pass filter and a correction signal and then outputting the resulting signal, a first comparator for binarizing an output signal of the adder and then outputting the resulting signal, and a low-pass filter, having a frequency characteristic complementary to the frequency characteristic of the high-pass filter, for suppressing a high frequency component of an output signal of the first comparator output signal to generate the correction signal. In addition to the configuration, the device is made to comprise a second comparator for binarizing the output signal of the adder taking a slice level as a reference and outputting the resulting signal as played-back data, and a controlling circuit for varying the slice level or a direct current level of the output signal of the adder in such a manner that a duty ratio of the played-back data become as prescribed value.

Further, a similar optical disc device may be substituted which is made to comprise a first high-pass filter for suppressing a low frequency component of the played-back signal and then outputting the resulting signal, an adder for adding an output signal of the first high-pass filter and a correction signal and then outputting the resulting signal, a first comparator for binarizing the output signal of the adder and then outputting the resulting signal, and a low-pass filter, having a frequency characteristics complementary to the frequency characteristics of the first high-pass filter, for suppressing a high frequency component of an output signal of the first comparator to generate the correction signal. Further, in addition to this configuration the device is made to comprise a second high-pass filter for removing a direct current component from the output signal of the adder and a second comparator for binarizing the output signal of the adder taking a slice level as a reference and outputting the resulting signal as played-back data.

With these means, by suppressing the low frequency component of the played-back signal at the high-pass filter, low frequency noise can be removed from the played-back signal. Further, low frequency components lost during removal of this low frequency noise can be reproduced by providing the correction signal added at the adder to the output signal of the high-pass filter so that the correction signal is generated from the low-pass filter having a frequency characteristic complementary with that of the high-pass filter to which low-pass filter the output signal of the adder is supplied after being binarized. The output signal of the adder is then binarized taking a slice level as a reference and the resulting signal is outputted as played-back data. By varying the slice level or a d.c. level of the output signal of the adder by the controller in such a manner that duty ratio of the played-back data becomes a prescribed value, the slice level or the d.c. level can be controlled in response to the d.c. level of the played-back signal varied in response to the amount of the light beam at recording, and edge variations occurring in the played-back data can be effectively avoided.

Similarly, by removing low frequency noise of the played-back signal using the first high-pass filter, then reproducing the low frequency component lost at the noise removal, removing the d.c. component from the signal using the second high-pass filter and then binarizing the resulting signal taking a specified slice level as a reference to generate the played-back data, the played-back signal can be binarized with the influence of the low frequency component of the modulation code and variations of the d.c. level which varies in response to the amount of light-beam at recording being effectively avoided, by which edge variations of the played-back data can be effectively avoided.

BRIEF DESCRIPTION OF THE DRAWING

FIG. 6A through FIG. 6D are waveform diagrams showing the relationship between slice level and laser power at the time of recording;

FIG. 7A and FIG. 7B are waveform diagrams illustrating the operation of the duty ratio detecting circuit in the played-back signal processing circuit of FIG. 3;

DETAILED DESCRIPTION OF THE PREFERRED EMBODIMENTS

First Embodiment

The following is a description with reference to the appropriate drawings of the embodiments of the present invention.

Figure 1:
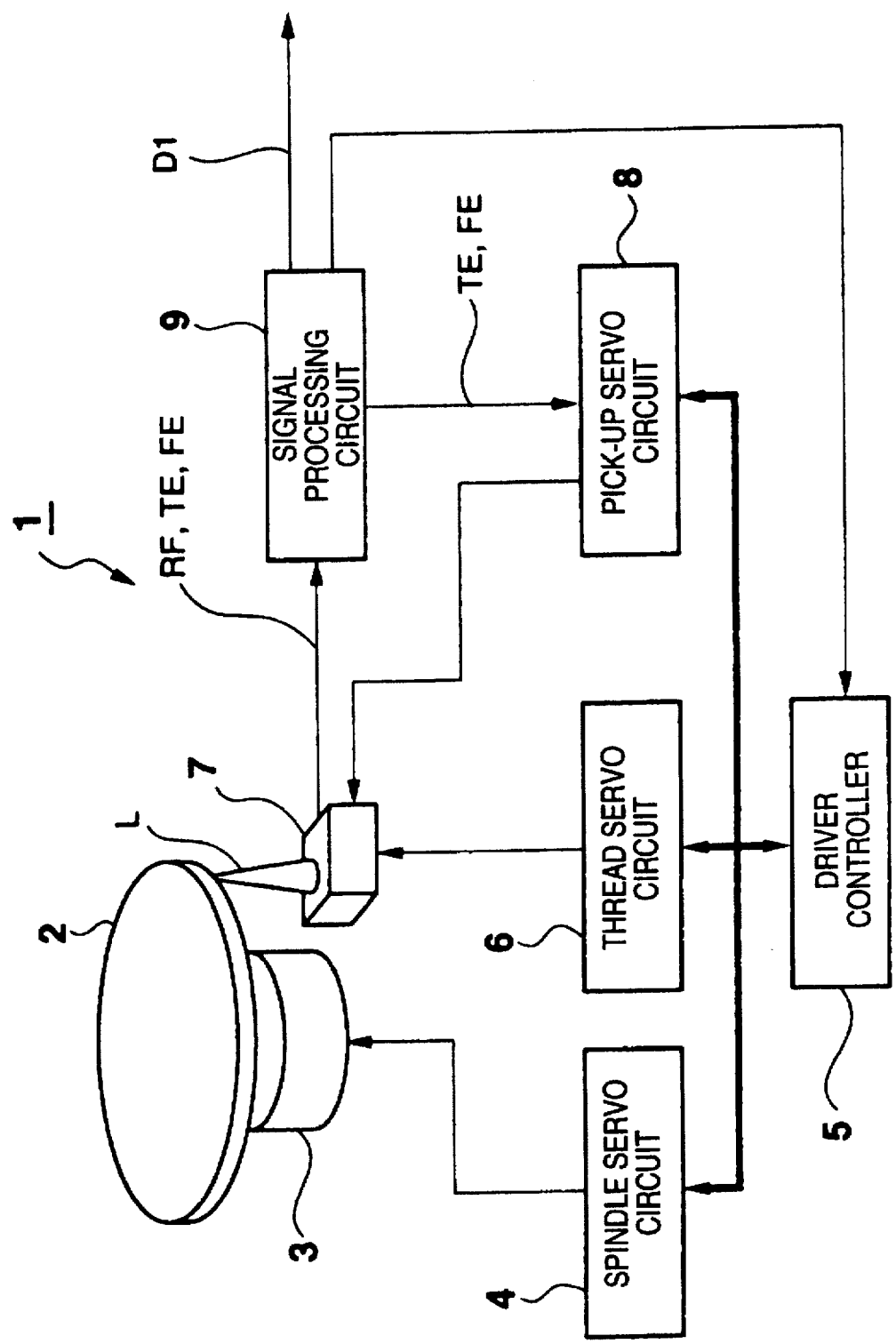
FIG. 1 is a block diagram showing the overall configuration of the optical disc drive of a first embodiment of the present invention.

FIG. 1 is a block diagram showing an optical disc drive of a first embodiment of the present invention. The operation of this optical disc drive can be switched over under the control of external equipment, with input data inputted by this external equipment being recorded on an optical disc 2, or data recorded on the optical disc 2 being played-back and outputted.

The optical disc 2 is a so-called phase change type optical disc, pre-formatted so as to be formed with pre-pits by a prescribed formatter. As a result, the optical disc 2 is tracking-controlled by the application of a so-called "sample format" technique so as to be rotatably driven at a prescribed rotational velocity. The recording and playback information can therefore be confirmed using pre-pits and the desired data can be recorded and played back in sector units.

A spindle motor 3 holds this optical disc 2 by chucking and this optical disc 2 is rotatably driven at a standard rotational velocity. A spindle servo circuit 4 is controlled by a drive controller 5 and control of the rotational velocity of the spindle motor 3 is carried out taking playback results of the pre-pit obtained by projecting a laser beam onto the optical disc 2 as a reference.

A thread servo circuit 6 is controlled by the drive controller 5 so as to drive a thread motor not shown in the drawings, move an optical pick-up 7 in the radial direction of the optical disc 2 and execute tracking control processing together with driving of the tracking control mechanism of the optical pick-up 7.

The optical pick-up 7 emits a laser beam L from a built-in laser diode and projects this laser beam L onto the optical disc 2 via an object lens. The optical pick-up 7 also receives returned light of this laser beam L with a light-receiving element via the object lens and performs arithmetic processing on the results of the light reception using an arithmetic processing circuit not shown in the drawings.

In this way, the optical pick-up 7 generates an RF played-beck signal with a signal level varying in accordance with changes in the amount of returning light, a focus error signal FE with a signal level varying in response to the amount of defocusing of the laser beam L and a tracking error signal TE with a signal level varying in response to the extent of de-tracking of the laser beam L.

In this way, in projecting the laser beam, the optical pick-up 7 is controlled by a built-in automatic light-amount controlling circuit so that the amount of laser light during recording is intermittently raised from that during playback to that during writing at the user data regions of each section. In this way, pits are sequentially formed on the optical disc 2 in correspondence with coded data inputted by the signal processing circuit and this coded data is recorded on the optical disc 2.

At this time, the optical pick-up 7 controls the amount of light for writing on the basis of the results of the test writing to the test writing region and the ambient temperature. In this way, pits of fixed shapes are formed even when sensitivity of the optical disc 2 is different or when the ambient temperature changes.

A pick-up servo circuit 8 moves the object lens of the optical pick-up 7 to the right and left, and up and down in correspondence with a tracking error signal TE and a focus error signal FE inputted via a signal processing circuit 9 so as to perform tracking control and focus control. At the optical disc drive 1, the thread motor is simultaneously driven by the low frequency component of this tracking error signal TE so as to carry out tracking control.

The drive controller 5 is made up of a microcomputer for controlling the overall operation of this optical disc drive 1 and controls the operation of the servo circuits such as the thread servo circuit 6 in response to control commands inputted from external equipment and with reference to information on recording/playback position provided via the signal processing circuit 9. As a result, at the optical disc drive 1, the optical disc 2 can be accessed in response to requests from external equipment with the optical disc 2 being rotatably driven.

The signal processing circuit 9 binarizes the RF played-back signal outputted from the optical pick-up 7 and generates played-back data from which a playback clock is generated. The signal processing circuit 9 then carries out decoding and error correction of the played-back data taking the playback clock as a reference so as to playback and output data D1 recorded on the optical disc 2.

At this time, the signal processing circuit 9 plays back the preformatted address data by taking in and processing the played-back data and outputs the pre-formatted address data to the drive controller 5. In this way, at the optical disc drive 1, the recording/playback position can be made certain and thus the desired sector can be accessed. The signal processing circuit 9 further outputs the tracking error signal TE and the focus error signal FE to the pick-up servo circuit 8 with these signals being amplified.

Figure 2:
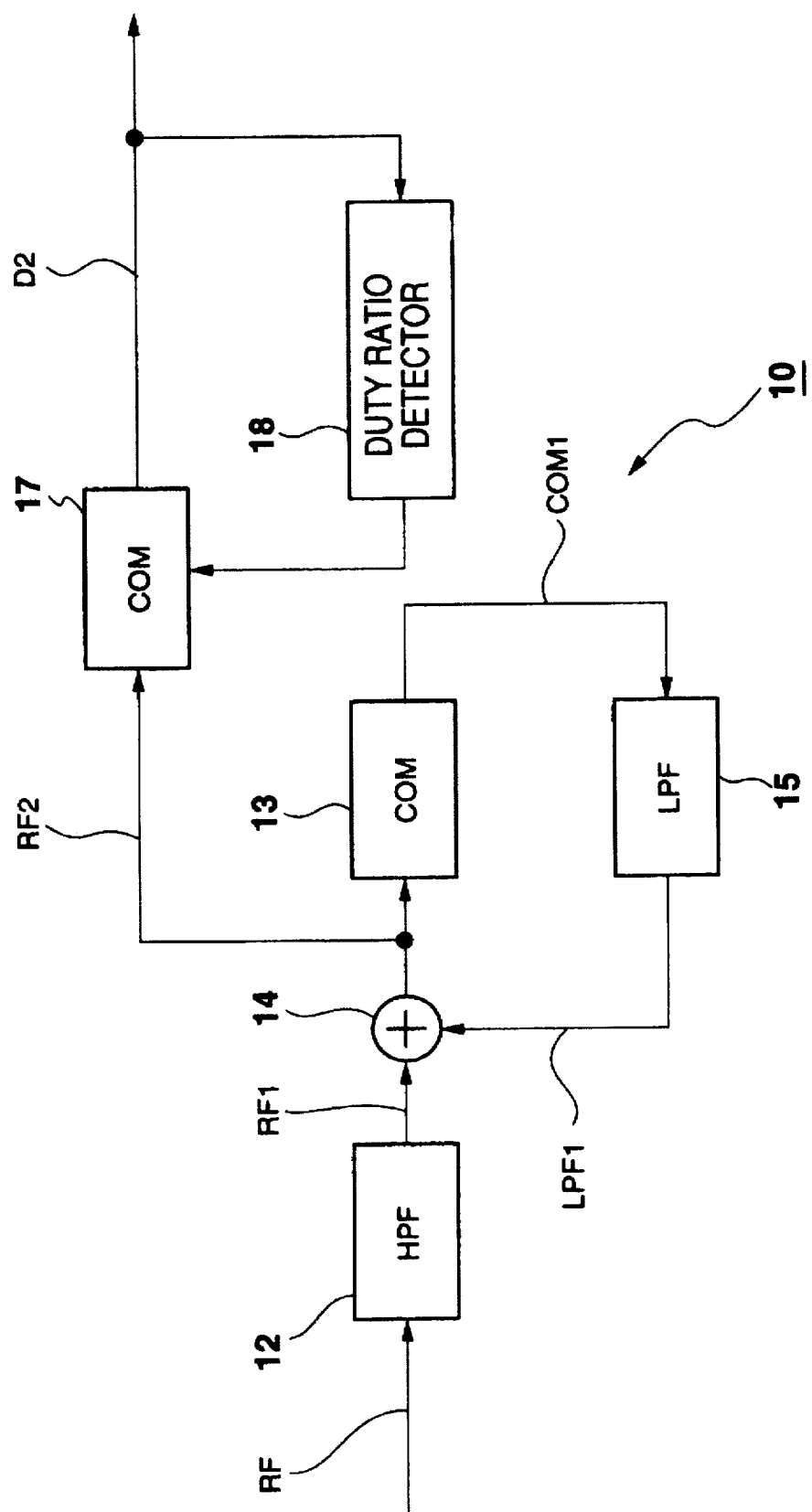
FIG. 2 is a block diagram showing a played-back signal processing circuit of an optical disc drive relating to the first embodiment of the preset invention.

FIG. 2 is a block diagram showing a played-back signal processing circuit in the signal processing circuit 9. The signal processing circuit 9 performs binarization after the signal level of the RF played-back signal has been corrected at the played-back signal processing circuit 10 so as to generate played-back data D2. Processes such as decoding and error correction are then executed by a following digital signal processing circuit and data D1 is outputted.

At the played-back signal processing circuit 10, a high-pass filter (HPF) 12 suppresses the low frequency region of the RF played-back signal and then outputs the RF played-back signal so that low frequency noise is removed from the RF played-back signal. A comparator (COM) 13 then receives the output signal RF1 of this high-pass filter 12 via an adder 14 and then binarizes this output signal RF1 before being outputted.

The low-pass filter (hereinafter referred to as "LPF") 15 has a frequency characteristic set to be complementary to the frequency characteristic of the high pass filter 12. This LPF 15 suppresses the low frequency component of the output signal COM1 of the comparator 13 and feeds this back to an adder 14. The adder 14 adds the output signal RF1 of the high-pass filter 12 to the output signal LPF1 of the low-pass filter 15 and outputs the result. In this way, the low frequency component of the RF played-back signal lost at the high-pass filter 12 is reproduced by means of the comparator 13, adder 14 and low-pass filter 15.

A comparator 17 binarizes a played-back signal RF2 outputted from the adder 14 so that played-back data D2 is generated from the played-back signal RF2 and outputted. A duty ratio detector 18 then changes the signal level of the output signal in correspondence with the duty ratio of the played-back data D2. This output signal is then outputted as the slice level of the comparator 17. In this way, the comparator 17 and the duty ratio detector 18 switch the slice level in such a manner that the duty ratio of the played-back data D2 becomes a prescribed duty ratio, by which the played-back signal RF2 is binarized. The edges of the played-back data D2 are therefore maintained at the correct timing even when the laser power fluctuates from the optimum value during recording and when the d.c. level of the RF played-back signal shifts.

Figure 3:
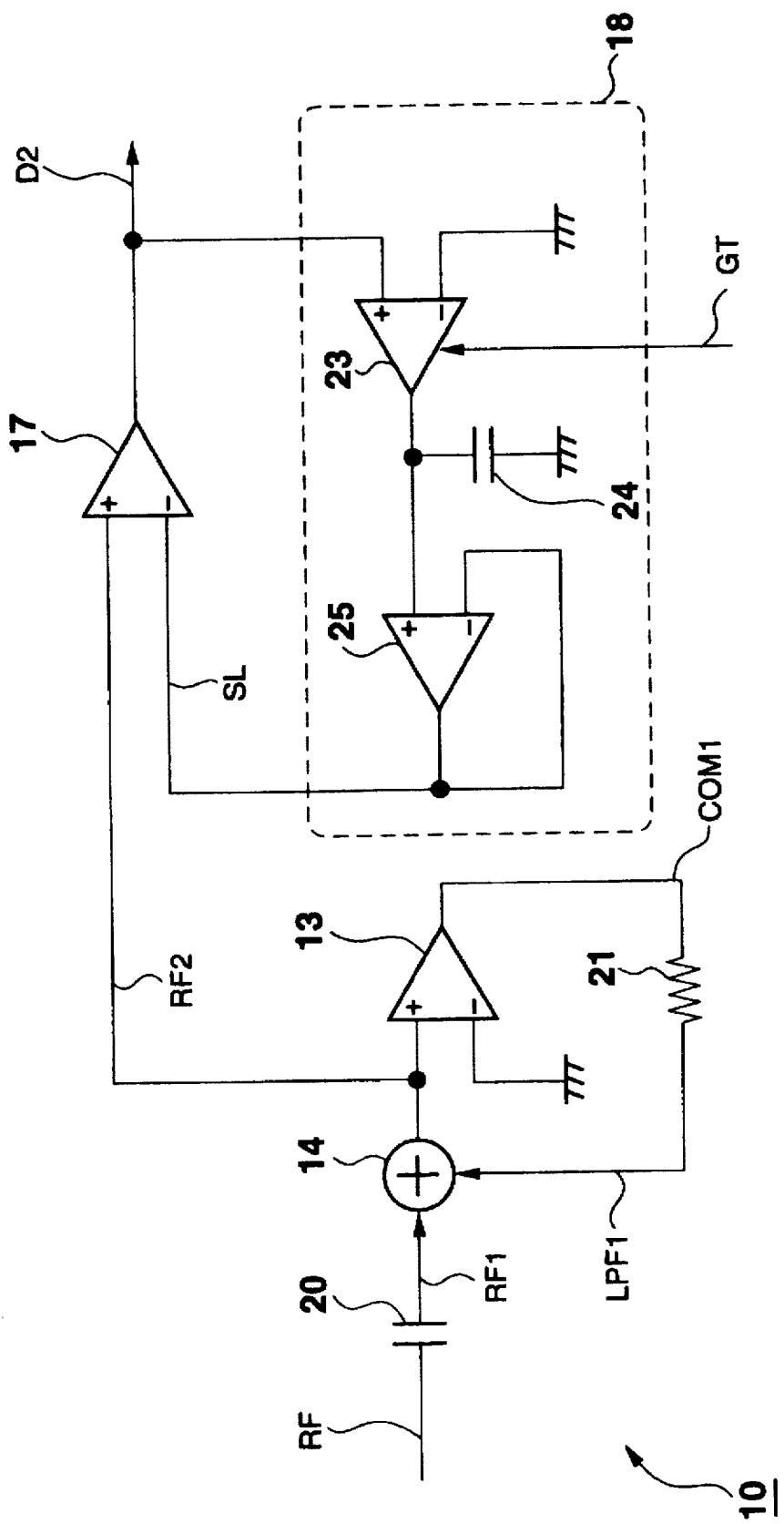
FIG. 3 is a connection diagram showing a specific configuration of the played-back signal processing circuit of FIG. 2.

Specifically, the played-back signal processor 10 is formed as shown in FIG. 3. Namely, the played-back signal processing circuit 10 receives the played-back signal RF1 at the adder 14 via a capacitor 20 and inputs the output signal RF2 of the adder 14 at the non-inverting input terminal of the comparator 13. The comparator 13 then sets the slice level to "0" by grounding the inverting input terminal and the played-back signal RF2 is then binarized using this slice level. The comparator 13 then outputs the binarized output signal to the adder 14 via a resistor 21.

Figure 4:
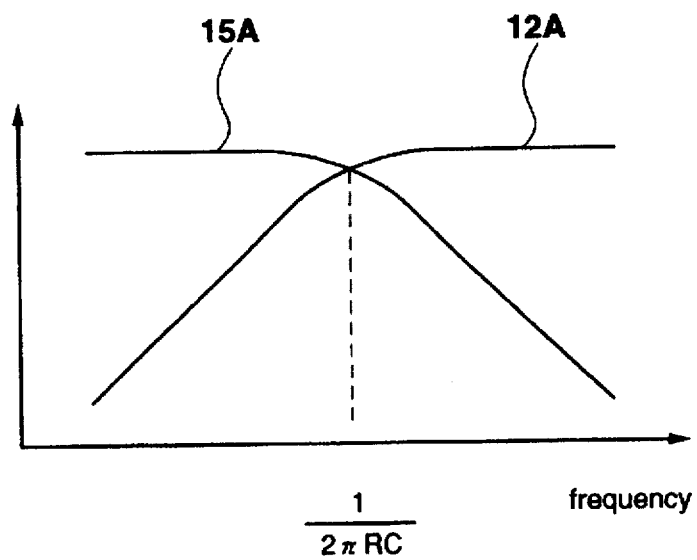
FIG. 4 is a graph showing characteristic curves of the high-pass filter and the low-pass filter of the played-back signal processing circuit of FIG. 2.

As a result, the capacitor 20 and the resistor 21 form a high-pass filter 12 (in FIG. 1) when viewed from the input end of the played-back signal processing circuit 10 and, when viewed from the output end of the comparator 13, form a low-pass filter 15 (in FIG. 2) having a characteristic 15A complementary to the frequency characteristic 12A of the high-pass filter 12 as shown in FIG. 4. The cut-off frequency f of the filters 12 and 15 is then expressed by $1/2\pi RC$, where C is the capacitance of the capacitor 20 and R is the resistance of the resistor 21.

Figure 5A:
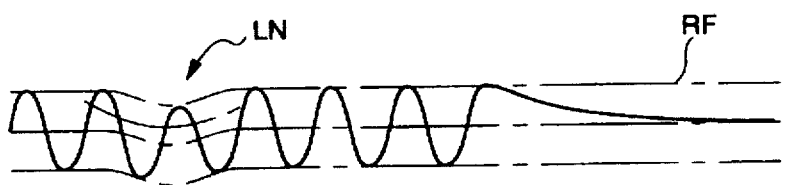
FIG. 5A through FIG. 5D are waveform diagrams for illustrating the reproduction of d.c. components at the played-back signal processing circuit of FIG. 2.
Figure 5B:
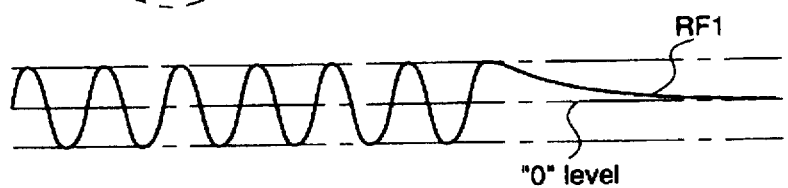
Figure 5C:
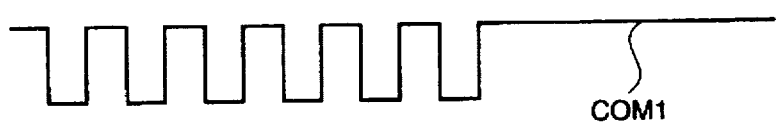
Figure 5D:
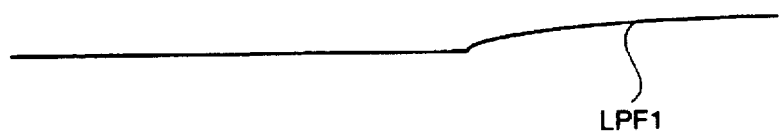

The played-back signal processing circuit 10 removes the low noise LN from the played-back signal RF shown in FIG. 5A using the high-pass filter 12 comprising the capacitor 20 and the resistor 21, and thus fluctuations of the played-back signal RF due to this low frequency noise are canceled as shown in FIG. 5B. The comparator 13 then binarizes the output signal RF1 of the high-pass filter 12 as shown in FIG. 5C which signal is inputted to the comparator 13 via the adder 14. This binarizes output signal is fed back via the low-pass filter 15 and the low frequency component of the played-back signal RF1 is therefore extracted as shown in FIG. 5D with a time constant determined by the capacitor 20 and the resistor 21, so that low frequency components lost due to the high-pass filter 12 can therefore be reproduced. At this time, the low frequency component lost at the high-pass filter 12 can be surely reproduced using the low-pass filter 15 by setting the frequency characteristics of the high-pass filter 12 and the low-pass filter 15 to be complementary.

When pits are sequentially formed by the laser beam L modulated by a recording signal S1 of a duty ratio of 50% as shown in FIG. 6A, with the laser power maintained at the optimum value, pits and lands are formed on the optical disc 2 with equal length in the direction of the track. As a result, in the played-back signal RF2 obtained by playing back with the lost d.c. level being reproduced, the d.c. level is held at the "0" level as shown in FIG. 6B and thus, the waveform of the original recorded signal can be reproduced by setting the slice level SL is set to "0".

Compared with this, when the laser power is smaller than the optimum value, the pits are formed with correspondingly shortened lengths and the d.c. level is reduced as shown in FIG. 6C. Therefore, in this case, the signal level of the slice level SL1 is made to fall compared with the case where the laser power has the optimum value, and thus, a recorded signal can be reproduced with a waveform of a duty ratio of 50% and the edge timing of the played-back data D2 can be set to be the correct timing.

On the contrary, when the laser power is larger than the optimum value, the bit length is correspondingly formed longer, and the d.c. level increases as shown in FIG. 6D. Therefore, in this case, when compared with the case where the laser power has the optimum value, the signal level, of the slice level SL2 is made to increase, and thus, a recorded signal can be also reproduced with a waveform of a duty ratio of 50% and the edge timing of the played-back data D2 can be set to be the correct timing.

Namely, when the d.c. level is played-back in this way, the slice level can be varied in response to the d.c. level of the played-back signal and the timing of the edge of the played-back data D2 can be set to be the correct timing. This relationship is effectively utilized so that the duty ratio of the played-back signal RF2 is detected with the timing for obtaining the RF played-back signal of duty ratio 50%, the slice level of the comparator 17 is set with the detected results, and the slice level is then controlled in response to the d.c. level of the RF played-back signal that varies in response to fluctuations of the laser power from this optimum value.

Namely, the comparator 17 (in FIG. 3) receives the played-back signal RF2 at the non-inverting input terminal and the output signal SL from the duty ratio detecting circuit 18 at the inverting input terminal.

The duty ratio detecting circuit 18 receives the played-back data D2 at a current-driven operational amplifier 23 which provides a charging current to an integrating capacitor 24 and in reverse makes the integrating capacitor 24 to release discharge current in response to the logic level of this played-back data D2. In this way, the duty ratio detecting circuit 18 is allowed to vary the terminal voltage of the integrating capacitor 24 in correspondence with the duty ratio of the played-back data D2.

At this time, at the duty ratio detecting circuit 18, the operational amplifier 23 is controlled by a gate signal GT outputted from a timing generator to carry out the aforementioned charging and discharging of the integrating capacitor 24, from the terminal voltage of which the duty ratio of the played-back signal RF2 is detected with the timing of a reference signal recorded on the optical disc 2.

On the optical disc 2, a reference signal VFO is recorded at a fixed period by pre-formatting and the necessary data is recorded after a similar reference signal VFO is repeatedly recorded a prescribed number of times while data is being recorded in the user data region. As the reference signal VFO, a reference signal of a duty ratio of 50% is assigned whose signal level is changed with a period of 2T compared with the reference period T for forming pits on the optical disc 2 as shown in FIG. 7A. A playing-back clock is then generated at the optical disc drive 1 by a PLL circuit taking the played-back results of the reference signal VFO as a reference.

The gate signal GT is generated by the timing generator in such a manner that the signal level rises at the timing of the reference signal VFO recorded at the head of the pre-formatted area as shown in FIG. 7B. In this way, the operational amplifier 23 detects variations in the d.c. level of the played-back signal RF2 taking the played-back data D2 for the reference signal VFO as a reference.

The duty ratio detecting circuit 18 outputs the terminal voltage of the integrating capacitor 24 to the comparator 17 via an operational amplifier 25 forming a voltage follower and the slice level of the comparator 17 can then be varied in correspondence with the results of the detected duty ratio.

Figure 8A:
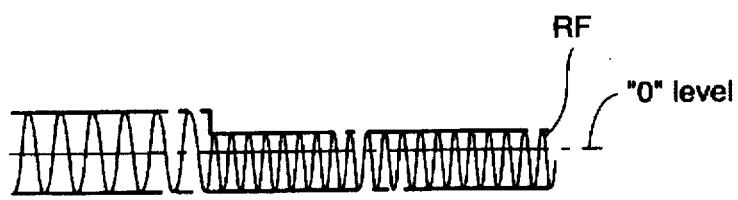
FIG. 8A through FIG. 8E are waveform diagrams illustrating generation of played-back data D2.
Figure 8B:
Figure 8C:
Figure 8D:
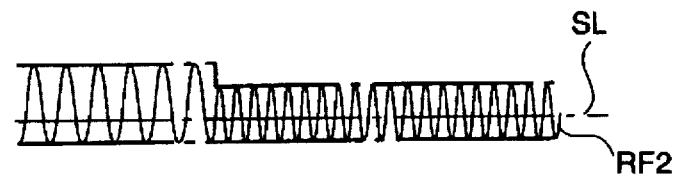

For example, when data recorded by a light with an amount lower than the optimum one is played-back, low frequency noise included in the played-back signal RF as shown in FIG. 8A is removed from the signal RF at the high-pass filter 12 with the low frequency component being lost as shown in FIG. 8B. However, by adding the output signal LPF1 of the low-pass filter 15 as shown in FIG. 8C, the lost low frequency component is reproduced as shown in FIG. 8D.

Figure 8E:

Further, with this played-back signal RF2, the slice level SL can be variably controlled in correspondence with the played-back d.c. level and the played-back data D2 is generated as shown in FIG. 8E taking this slice level SL as a reference. The played-back data D2 can then be properly binarized with the slice level SL being corrected in correspondence with the d.c. level varying in response to these variations and the original waveform of the recorded signal can be correctly played-back even when the laser power deviates from the optimum power during recording.

As a result, at the optical disc drive 1, as the playback clock is generated using the played-back data D2 for the reference signal VFO, the playback clock can be generated at the correct timing. By processing the other played-back data with the playback clock taken as a reference, the played-back data D2 can be processed with bit errors being effectively avoided. In this way, high-density recorded data can be reliably played-back.

With the above configuration, a laser beam L is projected by the optical pick-up 7 onto the optical disc 2 with the optical disc 2 being rotatably driven by the spindle motor 3. The returned laser beam L is then received by the optical pick-up 7 and signals such as the RF played-back signal, tracking error signal TE and focus error signal FE are generated.

Of these signals, the played-back signal RF is inputted to the signal processing circuit 9 and binarized to generate played-back data D2. This played-back data D2 then undergoes prescribed processing and the data D1 recorded on the optical disc 2 is played-back.

At the signal processing circuit 9 the RF played-back signal is inputted to the capacitor 20 of the played-back signal processing circuit 10 as shown in FIG. 2 and FIG. 3, the high-pass filter 12 formed by the capacitor 20 and the resistor 21 removes the low frequency noise with which the low frequency component is lost. The resulting played-back signal RF1 is then inputted to the comparator 13 via the adder 14 and binarized with "0" level being taken as a reference level. The low frequency component is then reproduced by the low-pass filter 15 comprising the resistor 21 and the capacitor 20 and having a characteristic complementary to the high-pass filter 12. This reproduced low frequency component is added to the played-back signal RF1 at the adder 14.

In this way, the resulting played-back signal RF2 is then inputted to the comparator 17 with the d.c. component being maintained while just the low frequency noise being removed. Here, the played-back signal RP2 is binarized using the slice level SL and the played-back data D2 is generated. At this time, variations in the duty ratio of the played-back signal RF2 are detected by means of the operational amplifier 23 which charges and discharges the integrating capacitor 24 by a voltage in correspondence with the logic level of the played-back data D2 with the timing of the reference signal VFO of a duty ratio of 50% as shown in FIG. 7A. The slice level SL is then controlled in response to these detected variations.

In this way, the played-back signal RF2 is binarized to be then converted to the played-back data D2 with the slice level SL being controlled so that influence of fluctuations in the laser power at the time of recording are compensated. The edges of the played-back data D2 can therefore be held at the correct timing even when the laser power fluctuates from the optimum value.

With the above configuration, the low frequency noise is removed from the played-back signal by the high-pass filter and low frequency components lost during removal of the low frequency noise is reproduced using a low-pass filter with a frequency characteristics complementary to the high-pass filter. The resulting signal is then binarized by controlling the slice level in such a manner that the duty ratio becomes a prescribed value, by which the edges of the played-back data D2 are then maintained at the correct timing even when the laser power deviates from the optimum value. Bit error occurrence is therefore effectively avoided and high-density recorded data can be played-back.

Second Embodiment

Figure 9:
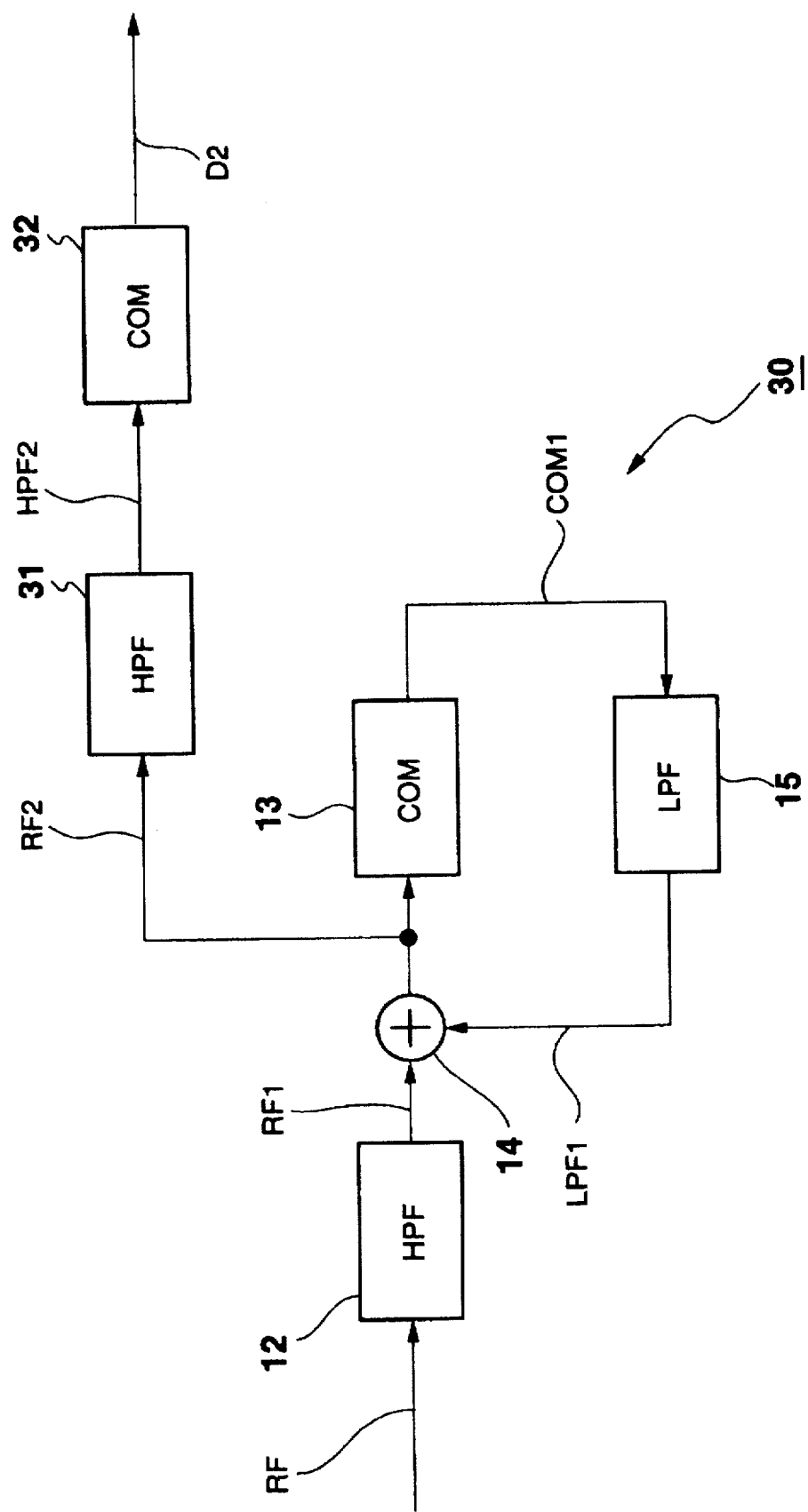
FIG. 9 is a block diagram showing the played-back signal processing circuit of the optical disc drive of the second embodiment of the present invention.
Figure 10:
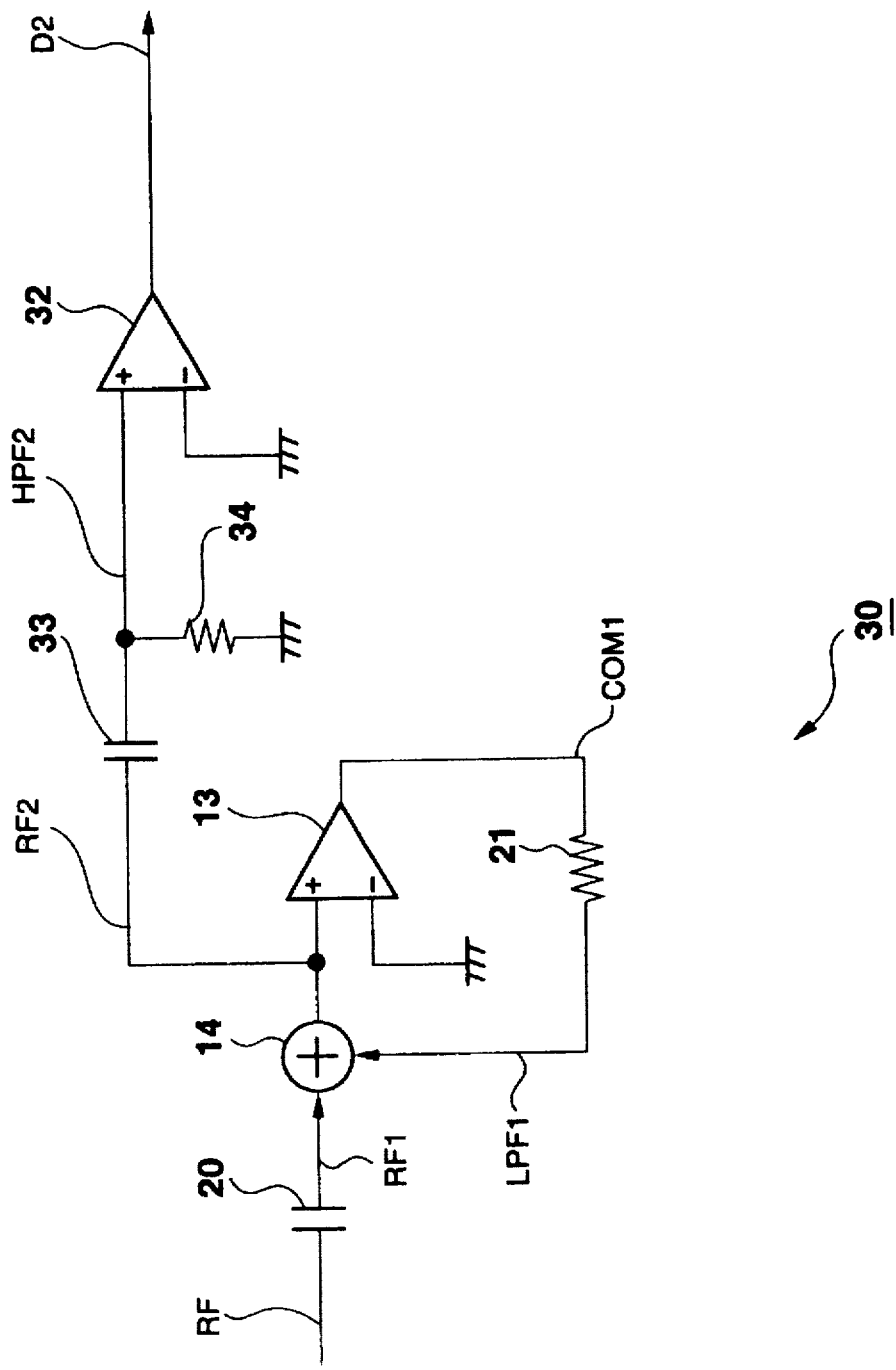
FIG. 10 is a connection diagram showing a specific configuration of the played-back signal processing circuit of FIG. 9.

FIG. 9 is a block diagram showing a played-back signal processing circuit relating to a second embodiment of the present invention. In this embodiment, played-back data D2 is generated from played-back data RF using a played-back signal processing circuit 30 instead of the played-back signal processing circuit 10 of the first embodiment. In FIG. 9 and FIG. 10, parts that are the same as those shown previously in FIG. 1 and FIG. 3 are denoted by the same reference numerals and their detailed description is omitted.

The played-back signal processing circuit 30 reproduces the d.c. component using the adder 14, comparator 13 and low-pass filter 15 after low frequency noise has been removed from the played-back signal RF by the high-pass filter 12. Further, at the played-back signal processing circuit 30, the output signal RF2 of the adder 14 is inputted to the high-pass filter 31 and the d.c. level generated due to deviations of the laser power from the optimum value is removed. The played-back data D2 is then generated by a comparator 32.

Specifically, as shown in FIG. 10, the played-back signal RF2 outputted from the adder 14 is inputted to a high-pass filter comprising a capacitor 33 and a resistor 34. An output signal HPF2 of the high-pass filter is then inputted to the non-inverting input terminal of the comparator 32. The inverting input terminal of the comparator 32 is grounded so as to set the slice level to zero.

The high-pass filter comprising the capacitor 33 and the resistor 34 has a cut-off frequency selected to be sufficiently lower compared with the cut-off frequency of the first high-pass filter 12. Hence, only the d.c. component of the played-back signal RF can be removed with the waveform degradation of the output signal HPF2 being effectively avoided. As a result, at the played-back signal processing circuit 30, a low frequency component including the d.c. component further lower compared with that removed by the first high-pass filter 12 is removed from the played-back signal RF2 having the reproduced d.c. component the played-back signal processing circuit 30 therefore binarizes the played-back signal by removing variations in the d.c. level changing in correspondence with the laser power during recording.

Figure 11A:
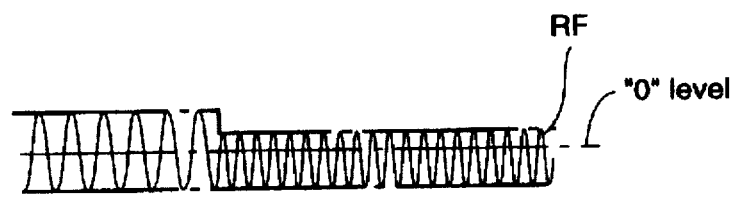
FIG. 11A through FIG. 11F are waveform diagrams illustrating the operation of the played-back signal processing circuit of FIG. 10.
Figure 11B:
Figure 11C:
Figure 11D:
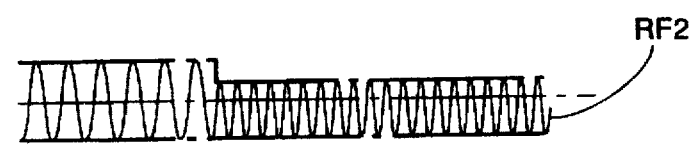
Figure 11E:
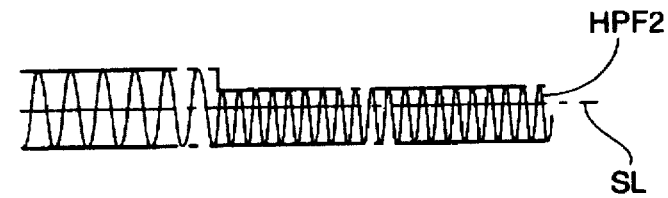

From the played-back signal RF inputted to the played-back signal processing circuit 30 as shown in FIG. 11A, low frequency noise is removed by the high-pass filter 12 as shown in FIG. 11B with the low frequency component of the signal being lost. At the adder 14, the output signal LPF1 of the low-pass filter 15 shown in FIG. 11C is then added to the output signal RF1 of the high-pass filter 12 so that the lost low frequency component is reproduced in the played-back signal RF2 as shown in FIG. 11D. The d.c. component is then removed (the d.c. level is made "0") at the following high-pass filter 31 as shown in FIG. 11E.

Figure 11F:

As a result, at the comparator 32, the output signal HPF2 of the high-pass filter 31 is binarized taking the "0" slice level SL as a reference. Thus, the influence of the low frequency component of the modulation code and the influence of variations in the laser power is effectively prevented and the played-back data D2 can be generated to have the same waveform as that of the recorded signal as shown in FIG. 11F.

According to the configuration shown in FIG. 9, the low frequency noise is removed from the played-back signal by the high-pass filter, the lost low frequency components are then reproduced and the resulting signal is then binarized with the d.c. component being further removed. In this way, the edges of the played-back data D2 can be maintained with correct timing even when the laser power deviates from the optimum value, by which occurrence of bit error is effectively avoided and high-density recorded data can be played-back.

Third Embodiment

In the aforementioned first embodiment, the case of controlling the slice level of the comparators using results of duty ratio detection was described. However, the present invention is by no means limited in this respect and control can also be performed using the d.c. level of the output signal outputted by the adder 14 instead of the slice level. In this case, for example, the output signal of the adder 14 can be clamped using a clamp circuit, and the clamp level can then be controlled using the results of the duty ratio detection.

In this case, the reference signal VFO, for example, has the d.c. level being at a "0" level and thus, by clamping the d.c. level to be "0" in the played-back signal RF of the reference signal VFO, played-back data having a duty ratio of 50% can be obtained with the slice level being at "0" level. In this way, by clamping the d.c. level of the played-back signal RF2 so that it becomes "0" level at the timing of the reference signal VFO, the d.c. level can be corrected with respect to the output signal of the adder so that the duty ratio thereof becomes a prescribed value with a simple configuration.

Further, in the first embodiment described above, the duty ratio is detected using an integrating circuit, but the present invention is by no means limited in this respect and the duty ratio can also be detected using, for example, results of phase comparisons between playback clocks, etc.

In the above embodiments, the case of recording and/or playing-back of desired data using a phase change optical disc was described, but the present invention is by no means limited in this respect and can be widely applied to the case of, for example, recording and/or playing-back desired data using a magneto-optical disc or playing-back desired data using a ROM optical disc.

According to the present invention described above, the influence of noise can be effectively avoided and high-density recorded data can be reliably played-back even when the d.c. level of the played-back signal fluctuates due to variations in the laser power by removing the low frequency noise from the played-back signal, then reproducing the lost low frequency component, and binarizing the resulting signal with the slice level or d.c. level varied in such a manner that the duty ratio becomes a prescribed value or binarizing the resulting signal with the "0" level for which the d.c. component is removed.

What is claimed is:

1. An optical device for playing back data recorded on a disc-shaped recording medium on the basic of a played-back signal obtained by projecting a light beam onto said disc-shaped recording medium and receiving said light beam returned from said disc-shaped recording medium, comprising:

a high-pass filter for suppressing a low frequency component of said played-back signal and outputting the resulting signal an adder for adding an output signal of said high-pass filter and a correction signal and outputting the resulting signal;

a first comparator for binarizing an output signal of said adder and outputting the resulting signal;

a low-pass filter, having a frequency characteristic complementary to the frequency characteristic of said high-pass filter, for suppressing a high frequency component of an output signal of said first collator to generate said correction signal;

a second comparator for binarizing said output signal of said adder taking a slice level as a reference and outputting the resulting signal as played-back data; and a controlling circuit for varying one of said slice level and a direct current level of said output signal of said adder in such a manner that a duty ratio of said played-back data becomes a prescribed value.

2. An optical device for playing back data recorded on a disc-shaped recording medium on the basis of a played-back signal obtained by protecting a light beam onto said disc-shaped recording medium and receiving said light beam returned from said disc-shaped recording medium, comprising:

a first high-pass filter for suppressing a low frequency component of said played-back signal and outputting the resulting signal;

an adder for adding an output signal of said first high-pass filter and a correction signal and outputting the resulting signal;

a first comparator for binarizing said an output signal of said adder and outputting the resulting signal;

a low-pass filter, having a frequency characteristic complementary to the frequency characteristic of said first high-pass filter, for suppressing a high frequency component of an output signal of said first comparator to generate said correction signal;

a second high-pass filter for removing a direct current component from said output signal of said adder; and a second comparator for binarizing said output signal of said adder taking a slice level as a reference and outputting the resulting signal as played-back data.

* * * * *

UNITED STATES PATENT AND TRADEMARK OFFICE
CERTIFICATE OF CORRECTION

PATENT NO.: 5,710,750
DATED: January 20, 1998
INVENTOR(S): KAORU TACHIBANA

It is certified that error appears in the above-identified patent and that said Letters Patent is hereby corrected as shown below:

In Col. 10, line 51, after "signal" insert a semicolon --;--

In Col. 10, line 60, replace "collator" with --comparator--

In Col. 11, line 5, replace "protecting" with --projecting--

Signed and Sealed this

Fourth Day of August, 1998

Attest:

BRUCE LEHMAN

Attesting Officer

Commissioner of Patents and Trademarks